United States Patent [19]

Carter

[11] E Re. 31,445

[45] Reissued Nov. 22, 1983

[54] SUBMERGED PUMPING SYSTEM

[75] Inventor: James C. Carter, Pasadena, Calif.

[73] Assignee: ITT, New York, N.Y.

[21] Appl. No.: 842,931

[22] Filed: Oct. 19, 1977

Related U.S. Patent Documents

Reissue of:

[64] Patent No.: 3,369,715
Issued: Feb. 20, 1968
Appl. No.: 548,985
Filed: May 10, 1966

[51] Int. Cl.[3] ..... B65D 88/76; B67D 5/50

[52] U.S. Cl. ..... 222/333; 222/385

[58] Field of Search ..... 222/333, 334, 385; 415/143, 199.1; 417/421, 338, 372

[56] References Cited

U.S. PATENT DOCUMENTS

| | | | |
|---|---|---|---|
| 2,034,419 | 3/1936 | Potter | 417/421 |
| 2,100,560 | 11/1937 | Kennedy | 417/338 |
| 2,230,830 | 2/1941 | Coberly | 166/68.5 |
| 2,901,889 | 9/1959 | Reed | 405/53 |
| 2,969,742 | 1/1961 | Arutunoff | 415/143 |
| 3,093,269 | 6/1963 | Messer | 222/333 |
| 3,112,049 | 11/1963 | Messer | 222/333 |
| 3,304,877 | 2/1967 | Carter et al. | 417/372 |

*Primary Examiner*—Allen N. Knowles
*Attorney, Agent, or Firm*—T. E. Kristofferson; T. L. Peterson

[57] ABSTRACT

A submersible pumping system especially adapted to cryogenic storage systems which includes a single fluid transmitting casing extending from the top to near the bottom of the storage container, a normally closed spring biased foot valve on the bottom of the casing, a sealing gland closing the top of the casing having a shiftable portion, and a pump and motor unit suspended through the shiftable portion of the sealing gland in the casing and adapted to open the foot valve. The pump and motor unit is centered in the casing and aligned with the foot valve by mating frusto-conical collars associated with the pump and motor unit and with the valve assembly. The shiftable sealing gland allows the pump and motor unit to be lifted off the foot valve so as to close the valve without venting the casing.

30 Claims, 8 Drawing Figures

40a
41
35c
29a
44a
44b
35b
27
35a
30
31
28
43
43c
44a
43b
43d
43e
43f
V
40
29
41
27b
27
33
27a
26
28
31
30
21
22
12
43
35
43a
44
11
36
46
37
39
133
69
23
M
71
129
80
25
13

SUBMERGED PUMPING SYSTEM

Matter enclosed in heavy brackets [ ] appears in the original patent but forms no part of this reissue specification; matter printed in italics indicates the additions made by reissue.

This invention relates to pumping and storage systems especially suited for handling cryogenic materials and more particularly relates to an assembly immersible in a storage reservoir which will pump stored fluid from the bottom of the reservoir through a conduit that is adapted to be purged free of the fluid, then sealed from the reservoir and thereby providing an isolated passage for removal and replacement of the pumping equipment.

The pumping system of the present invention is especially useful with the recently developed "frozen hole" technique of storing cryogenic fluids although it is not limited to such usage. According to the "frozen hole" technique, underground liquified gas reservoirs are provided by excavating large diameter deep holes in the ground which are roofed over. The area around the excavated hole is frozen by a brine, by liquified gases such as nitrogen or the like to form an impervious shell. The hole is then filled with liquified natural gas known as LNG, or other liquified gases such as methane, butane, propane, ammonia, ethylene and the like. This sealed reservoir is maintained under positive pressure by the gaseous phase of the liquified gas which will develop by the "boiling action" of the liquified gas. These storage reservoirs may be very large, dimensions of 100 feet in diameter and 150 feet in depth are used to provide peak load reservoirs for natural gas, storage reservoirs for ships, tankers, and the like, etc. Stored cryogenic fluids are withdrawn as needed from below the liquid in the reservoir, generally at or adjacent the bottom of the reservoir.

Known deep well pumping systems are not satisfactory for delivering cryogenic gases from such "frozen hole" reservoirs. Known pumping systems provided no arrangement for removing and replacing the pump while maintaining pressure in the reservoir and preventing escape of the gases.

The present invention now provides an efficient pumping system for pressurized cryogenic gas storage reservoirs which accommodate easy removal and replacement of pumping equipment without loss of either fluid or pressure.

According to this invention, a conduit is immersed in the reservoir to convey the liquified gas from the bottom to the top of the reservoir. A foot valve is mounted at the intake end of this conduit and is biased to a closed position for sealing the interior of the conduit from the reservoir. A pump and motor unit sized for free movement in the conduit seats on the foot valve in sealed relation and opens the valve to the pump inlet. The pump then delivers fluid from the reservoir to the conduit for discharge at the top of the reservoir. The pump and motor unit is suspended from the closed top of the conduit by a tension member passing through the shiftable portion of a packing gland accommodating sufficient movement of the pump and motor unit toward and away from the foot valve so that the conduit will be sealed at the top until the pump and motor unit is raised sufficiently to permit closing of the foot valve. When it is desired or necessary to pull the pump and motor unit for repair or replacement, the conduit is purged of the cryogenic gas by injecting an inert gas such as nitrogen into the top of the conduit until the cryogenic gas is formed back through the pump and foot valve into the reservoir. After this purging, the pump and motor unit is raised by raising the shiftable portion of the packing gland which accommodates sufficient lift to move the unit off of the foot valve whereupon the valve closes and the conduit is sealed from the reservoir. The pump and motor unit may then be pulled through the conduit by means of cables, suspension tubes or the like.

Therefore a principal object of the present invention is to remedy heretofore encountered deficiencies in the storing and withdrawing of liquified gas from reservoirs by providing, between the lower interior of the reservoir and the atmosphere, a discharge conduit which can be readily purged of fluid, sealed from the reservoir, and house removable pumping equipment.

Another object of the invention is to provide a pressure lock for liquified gas storage reservoirs wherein a casing scaled to the roof of the reservoir extends therefrom close to the bottom of the reservoir and has a foot valve opened by a pump and motor unit lowered through the casing to withdraw the liquified gas from the reservoir.

Still another object of the invention is to provide a pressure lock between a main storage reservoir and the external atmosphere in the form of a casing extending from the roof of the reservoir close to the bottom thereof, in which the bottom end of the casing carries a foot valve biased into closed position, in which is suspended a removable pump and motor unit lowered along the casing to automatically open the foot valve for pumping fluid from the reservoir, and in which a shiftable sealing gland accommodates raising of the pump and motor unit sufficient to permit closing of the valve without venting the casing.

A specific object of the invention is to provide an electric motor driven submersible pump unit and a coacting foot valve opened by the pump and providing a sealing seat for the pump.

Another object of the invention is to provide a slidable gland suspension for a pump and motor unit which will accommodate sufficient raising and lowering of the unit at the bottom of a casing without venting the casing.

Still another object of the invention is to provide a pressure lock for liquified gas storage reservoirs in the form of a casing sealed to the reservoir and extending to the bottom of the reservoir and sealed at its bottom by a spring biased foot valve in which a pump and motor unit lowered along the casing opens the valve to discharge the contents of the reservoir through the casing and is supported for movement adjacent the valve through a sliding seal gland at the top of the casing whereby the casing may be purged and the pump and motor unit lifted enough to permit closing of the valve before the casing is opened to remove the unit.

Other and further objects of this invention will become apparent to those skilled in this art from the following detailed description of the annexed sheets of drawings, which by way of preferred example, illustrate several embodiments of the invention.

Figure 1:
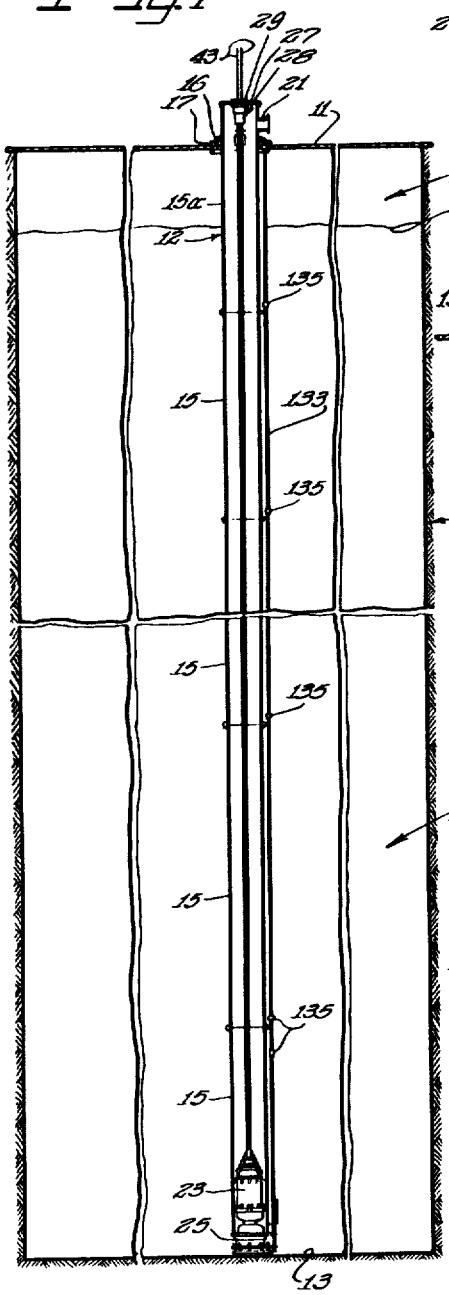
FIG. 1 is a broken generally diagrammatic vertical sectional view of an excavated "frozen hole" liquified gas storage reservoir, showing a pressure lock and pumping unit constructed in accordance with the principles of this invention extending from the roof to the bottom of the reservoir.

In FIG. 1, the reference numeral 10 designates generally an excavated hole in the ground providing a reservoir R for liquified gas such as natural gas, methane, butane, propane, ammonia, ethylene and the like. The liquid level of the cryogenic material in the reservoir R is illustrated at L close to the roof 11 of the reservoir. The space S between the liquid level L and the roof 11 is filled with gas boiling off of the liquid and pressurizing the reservoir up to about 12 inches of water. For example, liquified natural gas boils at −260° F. and the positive pressure is maintained in the reservoir 10 to prevent intake of air with attendant fire and explosion hazards. The ground surrounding the excavated hole 10 is frozen first by injected brine or liquid nitrogen to form an impervious shell for the liquified gas which will thereafter maintain the frozen condition of the ground surrounding the hole.

Figure 2:
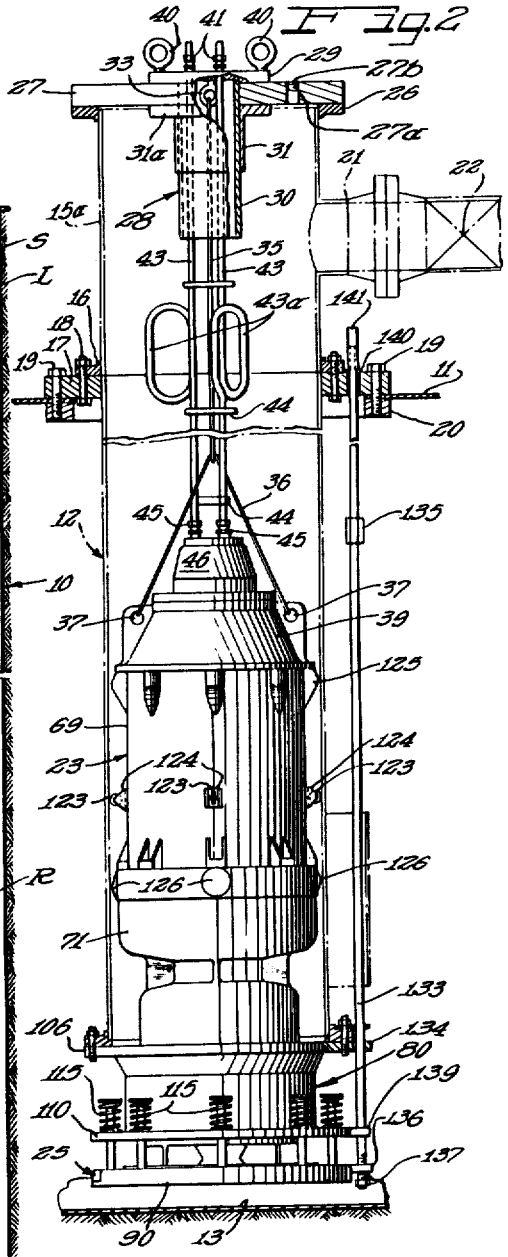
FIG. 2 is a broken vertical side view, showing portions of the pressure lock casing in phantom and in section, with the pump and motor unit in elevation and lowered to valve opening position in the bottom of the casing by means of a cable suspended through a slidable sealing gland at the top of the casing.

It will of course be understood that while the reservoir 10 is illustrated as being a "frozen hole" other types of reservoirs including above or below ground storage tanks, tank cars, tanker ships, and the like can usefully be serviced by the pumping system of this invention. In FIG. 1, the lock and pump system of this invention is illustrated as including a casing 12 suspended from the roof 11 of the reservoir and extending vertically downward to a position adjacent but preferably spaced above the bottom 13 of the reservoir. This casing 12 may be composed of individual large diameter pipe sections 15 suitably sealed at the joined-together ends to prevent leakage into or out of the casing. The top casing section $15^a$ extends through the roof 11, and as shown in FIG. 2, has a collar 16 therearound supported on a roof cover 17 and bolted thereto by means of bolts 18. The cover 17 in turn rests on top of the roof 11 and is secured thereto by screws 19 drawing a collar 20 against the bottom of the roof thereby clamping the roof between the collar and cover to form an effective seal.

The top casing section $15^a$ also has an outlet pipe fitting 21 extending from the side thereof above the roof 11 and adapted to be connected with a discharge valve 22 controlling flow of liquified gas from the interior of the casing 12.

The pump and motor unit 23 of this invention is sized to fit freely in the casing 12 and as illustrated in FIGS. 1 and 2, the unit 23 has been lowered to the bottom of the casing 12 to seat on a foot valve assembly 25 and to bias the foot valve of this asembly to an opened position thereby joining the reservoir R with the interior of the casing 12 through the unit 23.

The top casing section $15^a$ has an annular flange 26 around its top end and this top end is closed by a cap 27 secured to this flange. The cap 27 carries a slidable packing or sealing gland assembly 28. This assembly 28 includes a plate 29 resting on the cap 27. A sleeve 30 carried by this plate 29 extends through a central hole in the plate 27 in slidable engagement therewith. A second sleeve 31 is mounted under the plate 27 by means of a flange $31^a$ suitably secured to the plate as by welding, fastening bolts or the like and slidably receives the sleeve 30. The sleeve 30 is longer than the sleeve 31 and has a slidable sealing fit in the sleeve 31 so that when the plate 29 rests on the cap 27, the sleeve 30 will project beyond the bottom of the sleeve 31 and when the plate 29 is lifted off of the cap 27, the extended portion of the sleeve 30 will move into the sleeve 31 maintaining a sealing fit between the sleeves 30 and 31 for a considerable vertical travel distance of the plate 29 above the cap 27.

Figures 3, 4, 5:
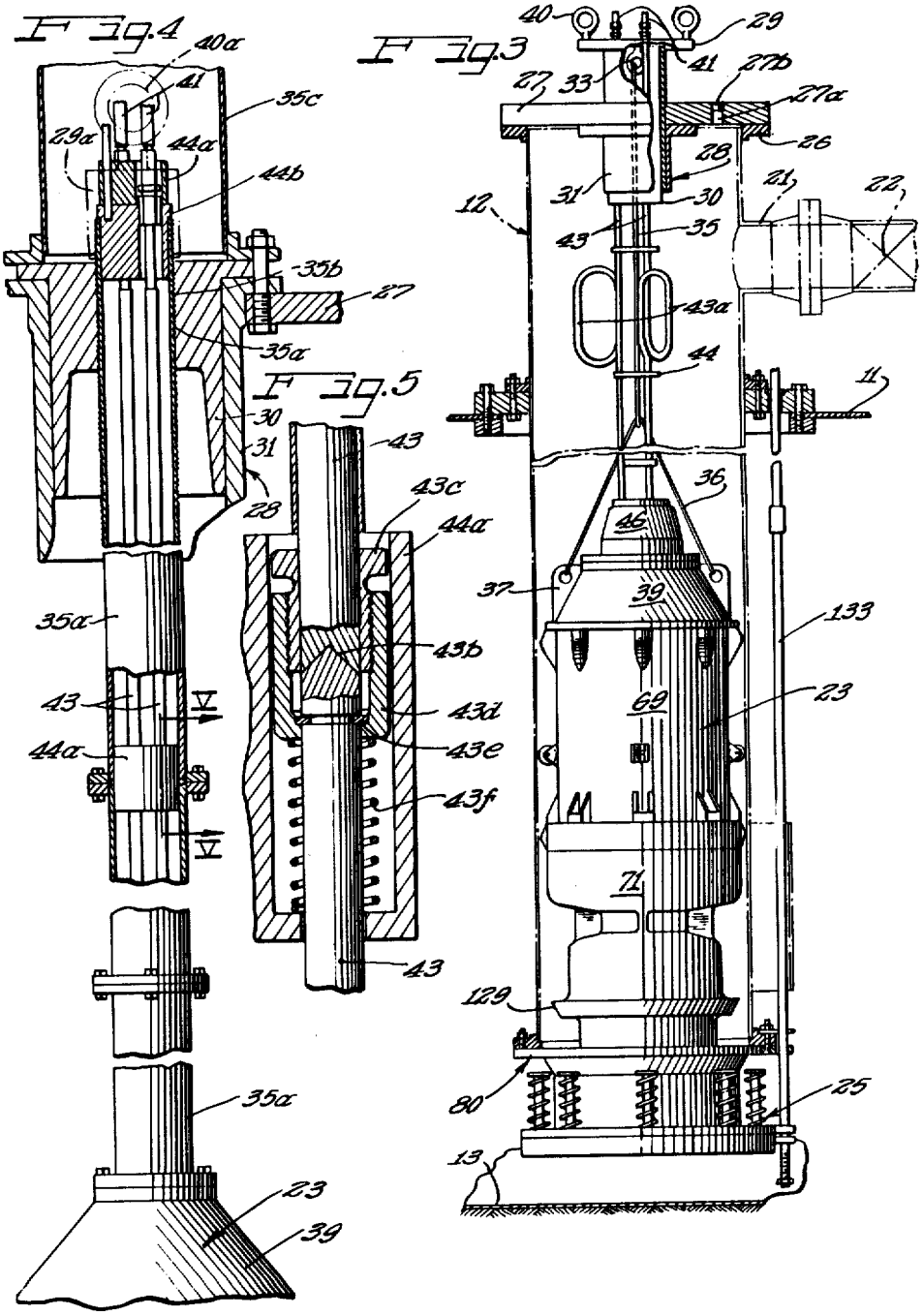
FIG. 3 is a view similar to FIG. 2 but showing the pump and motor unit lifted sufficiently in the casing to permit closing of the foot valve and illustrating the manner in which the sealing gland at the top of the casing permits this lifting without opening the casing to the atmosphere.
FIG. 4 is a fragmentary broken elevational view of an alternate suspension for the pump and motor unit wherein a multisection pipe or tube replaces the suspension cable.
FIG. 5 is an enlarged sectional view along the line V—V of FIG. 4 showing a coupling for uniting electrical conduit ends in the pipe sections.

In the form shown in FIGS. 1–3, the pump and motor unit 23 is suspended from the plate 29 by a cable harness and for this purpose, the plate 29 carries an eye 33 depending therefrom into the top of the sleeve 30. A cable 35 secured to this eye 33 supports a sling 36 connected to anchor brackets 37 on a head or top casing part 39 for the motor of the unit 23. The cable 35 and sling 36 are preferably formed from non-corrosive material such as stainless steel which is sufficiently flexible so that it might be wound up on a winch when the unit 23 is to be lifted out of the casing 12 as more fully hereinafter described.

The cap 27 has a purge hole $27^a$ therethrough closed by a plug $27^b$ adapted to be coupled to a pressurized source of inert gas such as nitrogen.

When it is desired to remove the pump and motor unit 23 for repair or replacement, the discharge valve 22 is closed, the interior of the casing 12 purged free from any of the contents of the reservoir R by feeding the pressurized purging gas through the hole $27^a$ in the top of the casing until all of the gas is forced back through the pump and foot valve into the reservoir R. When the casing 12 is free of the cryogenic material, the plate 29 is lifted from the cap 27 and for this purpose eye bolts 40 are provided on the plate 29 to receive a hoisting cable. When the plate 29 is lifted to the position of FIG. 3, the unit 23 will be lifted off of the foot valve and the valve will close thereby sealing the casing 12. Then the cap 27 can be removed from the top of the casing and the cable 35 wound on a winch or the like until the unit 23 is lifted to the top of the casing where it may be removed.

Figure 8:
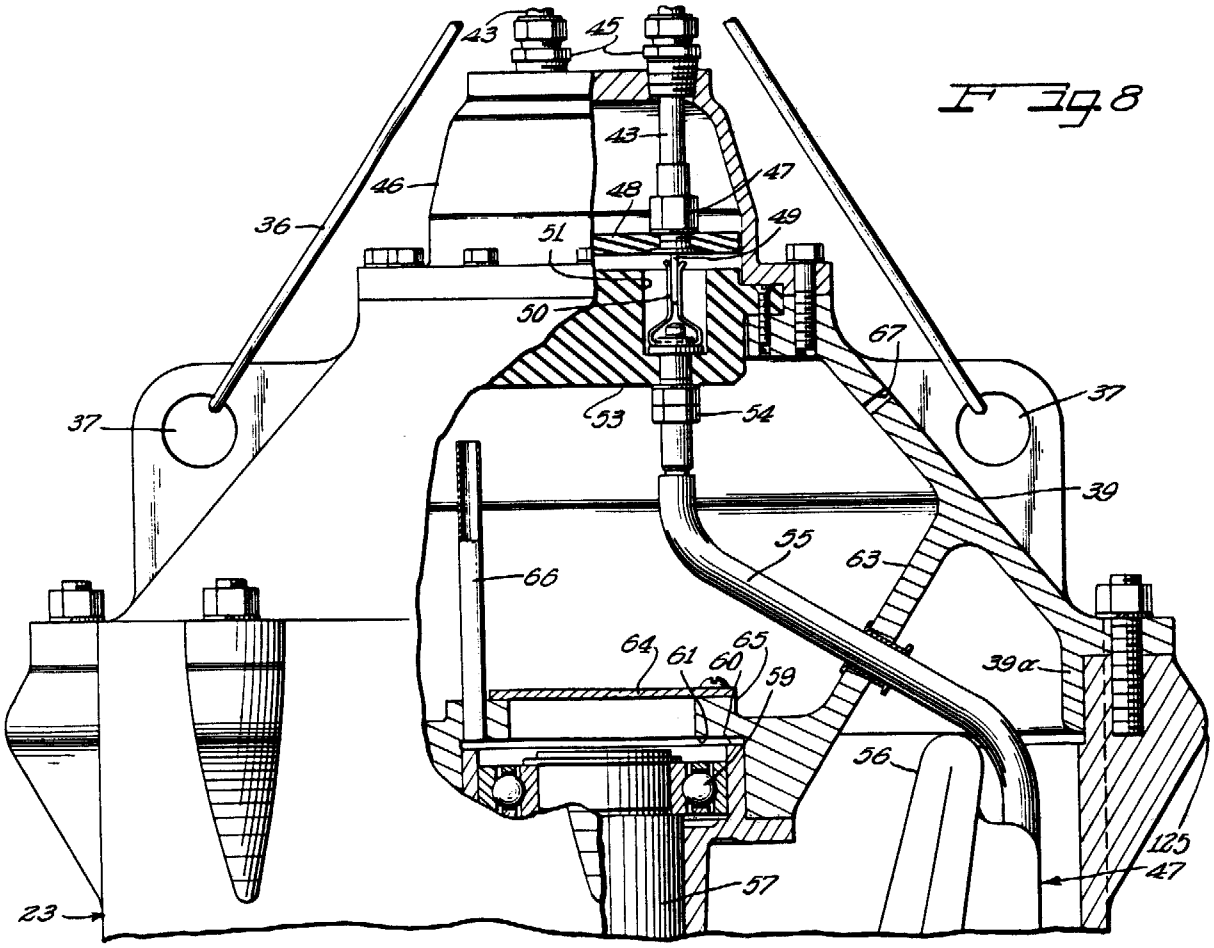
FIG. 8 is a fragmentary side elevational view, partly in vertical section, of the upper portion of the pump and motor unit showing one of the electrical connectors and a means for lubricating the motor from fluid being pumped.

The plate 29 also has fittings 41 providing liquid and gas tight connections for electrical cables or conduits 43 which extend downwardly through the sleeve 30 and are looped intermediate their ends as illustrated at 43$^a$, passing through spacers 44 to extend to fittings 45 (FIG. 8) in the top end cap 46 of the head 39 of the casing for the motor 47 of the unit 23. The cables 43 each terminate in a fitting 47 secured to an insulator plate 48 in the cap 46 and a contact blade 49 depending from the fitting 47 is received between the prongs of a knife blade receptacle 50 which is mounted in a socket 51 of an insulator block 53 carried by the casing portion 39. The knife blade receptable 50 is connected through a fitting 54 with an electrical conduit 55 to the field coils 56 of the motor 47. The ether cable 43 is similarly connected. The cables 43 are thus easily joined to and removed from the motor conduits 55 by mounting and removing the end cap 46 from the end casing 39.

As shown in FIG. 4, the cable suspension for the pump and motor unit 23 may be replaced with a rigid tube or pipe suspension composed of a series of rigid flanged end pipe sections 35$^a$ bolted together in sealed fixed relation with the lowermost section secured to the top casing part 39 for the motor of the unit 23 and with the top section threaded at 35$^b$ into sealed engagement with the inner packing sleeve 30. The electrical conduits 43 extend through the pipes 35$^a$ and may be of a rigid type divided into lengths coterminous with the pipe sections 35$^a$. The ends of the pipe sections carry insulated blocks 44$^a$ each containing spring biased fittings which tightly connect the ends 43$^b$ of the conduits and can shift in the blocks. As shown in FIG. 5, each fitting includes a nut 43$^c$ on the lower end of a cable rod section 43 threaded into a sleeve 43$^d$ rotatably held on the upper end of the adjacent section 43 by a lock washer 43$^e$ seated in a groove in the cable rod 43. A spring 43$^f$ biases the nut and sleeve assembly upwardly in the block 44$^a$ to accommodate shifting of the coupling under expension and contraction of movements of the conduit rods 43 relative to the pipe sections 35$^a$.

The gland assembly 28 of FIG. 4 will accommodate raising and lowering of the pump unit 23 through the pipe suspension for opening and closing of the foot valve 25 without venting the interior of the casing 12 to the atmosphere, in the same manner disclosed in connection with FIGS. 2 and 3. However, the top threaded pipe section extends above the gland sleeve 30 into a removable conduit housing which can be removed from the top of the sleeve 30 to expose the conduit fittings 41 and top insulation block 44$^a$ resting on a top connector housing 44$^b$ extending into the pipe 35$^a$. The wires in the housing 35$^c$ can be disconnected at the fittings 41 and a lifting block 29$^a$ with an eye 40$^a$ threaded on the pipe. The pipe sections 35 may then be pulled through the casing 12 in the same manner in which well drilling conduit is pulled. The tube suspension for the unit 23 provides a somewhat more rigid mounting in the casing 12, but, of course, is more troublesome to handle during pulling of the unit than the flexible cable.

The motor 47 may be a conventional induction motor and, as shown in FIG. 89, has a vertical shaft 57 journalled at its upper end in an antifriction bearing 59 carried in an upwardly opening bushing 60 which is mounted in a downwardly opening recess 61 of a settling basin portion 63 of the top casing 39. The bottom of the basin is closed by a plate 64 removably secured to an annular rib 65. A stand pipe 66 extends from the bottom of the basin to a level just below an inlet port 67 in he casing 39. Pumped cryogenic fluid from the casing 12 can flow through the port 67 to fill the basin 63 which will then overflow through the stand pipe 66 to lubricate the bearing 59. Any contaminants, of course, will settle out in the basin and the bearing will thus be protected.

Figure 6:
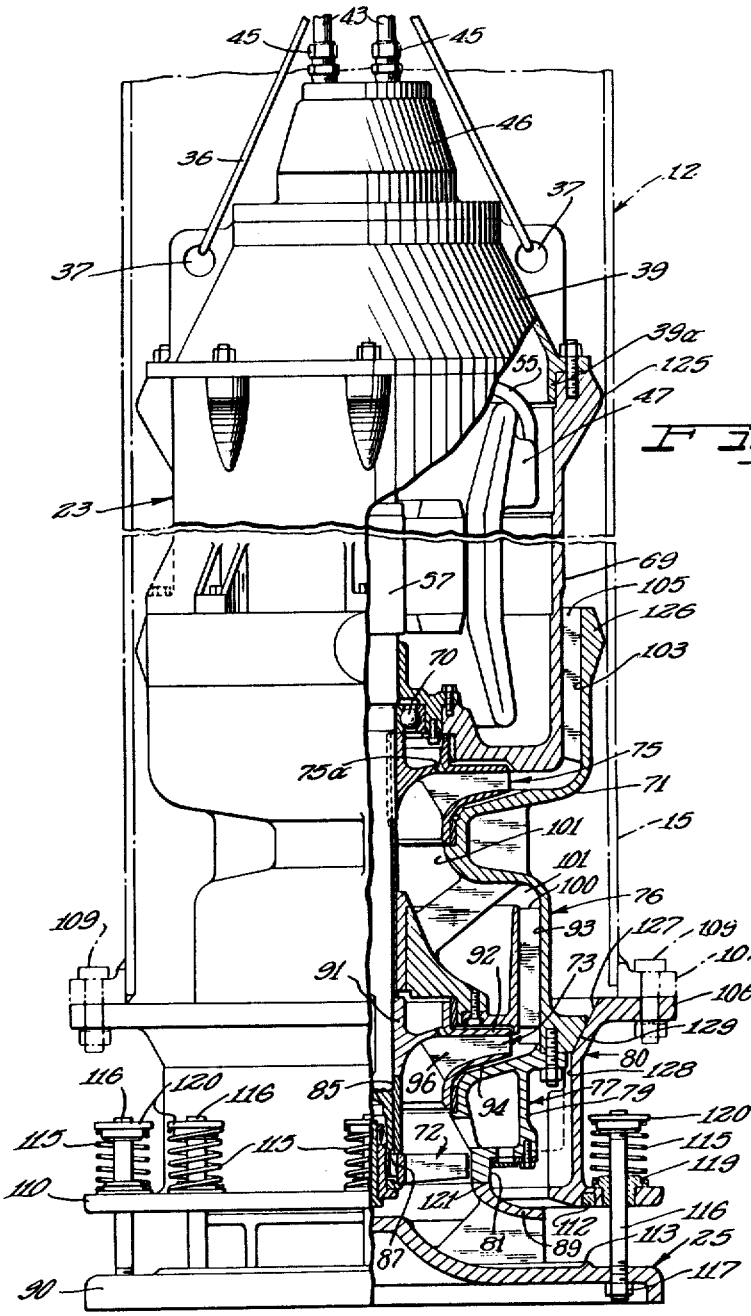
FIG. 6 is a side elevational view of the pump and motor unit and foot valve, with parts in vertical section and showing on a larger scale than in FIGS. 3 and 4, the pump and motor unit lowered in the foot valve to open the valve.

The motor shaft 57, as shown in FIG. 6, is also journalled in the bottom of an open topped cylindrical shell 69 in an antifriction bearing 70. This shell 69 receives, at its open top thereof, a depending flange 39$^a$ of the top casing 39 and is bolted to the top casing in a conventional manner as shown. The lower end of the shell in turn rests into an open topped pump casing 71 receiving the shaft 57 therethrough. The bottom end of the shaft has a flow inducer vaned impeller 72 mounted thereon and primary and secondary centrifugal vaned impellers 73 and 75 are keyed to the shaft at spaced intervals above the flow inducer 72 to form the impellers of a two-stage pump 76. The second stage impelled 75 is vented to the bearing 70 at 75$^a$ so that pumped fluid may flow from the top bearing 59 through the motor 47 to lubricate the lower bearing 70 and then drain through the vent 75$^a$ for reintroduction back to the fluid being pumped by the impeller 75.

The bottom open end of the pump casing 71 carries a hollow annular inlet eye defining member 77 surrounding the inducer 72 and providing a sliding seal and guide around the shroud of the impeller 73. This annular member 77 has an outer wall 79 adapted to project freely into the adapted housing 80 of the foot valve 25. An annular rim or rib 81 depends from the bottom of the housing 77 in closely spaced relation surrounding the inducer 72 and provides the annular inlet or eye for the pump.

Figure 7:
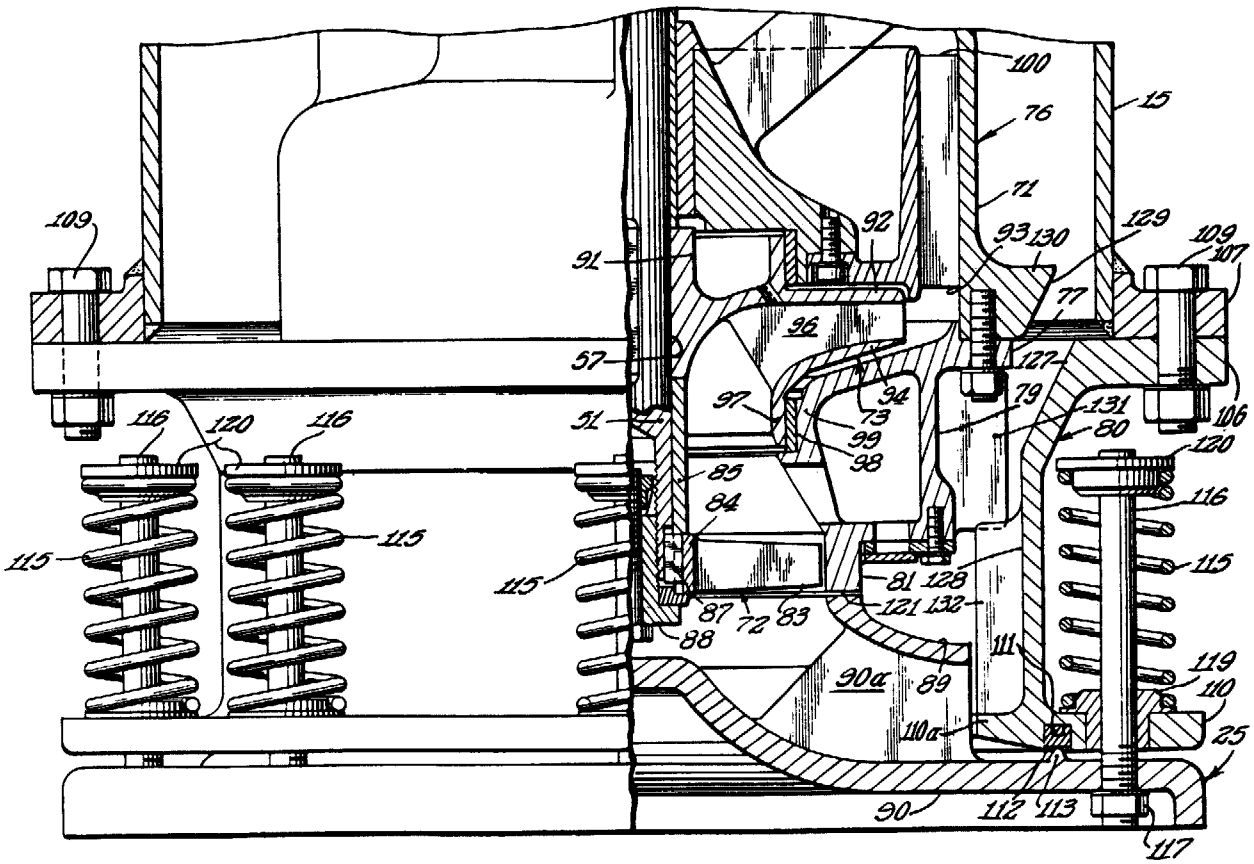
FIG. 7 is an enlarged view of the bottom portion of FIG. 6 showing the pump and motor unit raised sufficiently to permit closing of the foot valve.

The inducer impeller 72 has a plurality of circumferentially spaced vanes 83 extending radially of a central hub 84 keyed to the lower end of the motor shaft 57 beneath a spacer 85 as by means of the key 87 as best shown in FIG. 7. A conventional retainer 88 is threaded into the lower end of the shaft 57. The flow inducer 72 thus spans the inlet of the pump and coacts with an inlet fitting 89 opening to the periphery of a foot plate 90 for the foot valve 25. This foot plate 90 has upstanding ribs 90$^a$ at spaced intervals, therearound carrying the shroud fitting 89 which, as explained hereinafter, abuts the rim 81 so that fluid flows over the plate 90 under the action of the inducer blades 83 to the primary and secondary impellers 73 and 75. Since the inducer assembly 72 is very close to the bottom of the reservoir, the entire contents of the reservoir can be completely scavenged.

The primary impeller 73 is of the double shrouded type including a central hub 91 abutting the top of the spacer 85 and keyed or otherwise journalled to the shaft 57 for corotation. The impeller has a top shroud 92 extending radially of the hub 91 to the inlet end of an annular passage 93 inside of the pump housing 71 and surrounding the impeller. A bottom shroud 94 coacts with the shroud 92 and with circumferentially spaced upstanding impeller vanes 96 to provide a pumping passage opening axially upward and then radially outward into the annular passageway 93. The shroud 94 has a collar 97 engaging a wear collar or bearing member 98 which is recessed in an inwardly spaced wall portion 99 of the annular casing member 77.

Vanes 100 extend radially across the annular passageway 93 at circumferentially spaced intervals and are effective to convert the velocity head from the impeller vanes 96 to a pressure head. The annular passageway discharges beyond the vanes 93 into a flow passage 101 best shown in FIG. 6 converging to the eye of inlet end of the secondary impeller 75. This secondary impeller is constructed and operates in the same manner as the primary impeller 73 and is driven by the shaft 57 in the same manner. The secondary impeller 75 discharges liquid upwardly through an annular passage 103 containing balancing vanes 105 like the vanes 100. The fluid discharges out of the annular open top of the passage 103 into the casing 12 for upward flow therethrough to the outlet fitting 21.

The adapter housing 80 for the foot valve 25 is mounted on the bottom of the casing 12 through an annular flange 106 underlying a flange 107 at the bottom end of the last casing section 15. Nuts and bolts 109 connect the two flanges so that the housing is suspended from the casing 12 and need not rest on the bottom 13 of the reservoir.

The housing 80 is generally cylindrical terminating in its bottom end in an outturned flange or foot 110 which also has an inwardly extending lip 110a as best shown in FIG. 7. An annular groove 111 is formed in the bottom face of the foot 110 around the lip portion 110a thereof to receive a valve seat ring 112 made of yieldable packing material or plastic for forming a good seal with an annular valve face rim or ridge 113 on the top of the feet plate 90.

A plurality of circumferentially spaced compression springs 115 are supported about the foot flange 110. These springs 115 surround rods or bolts 116 threaded at their lower ends in the foot plate 90 and locked thereto by means of nuts 117. These rods 116 slide through bushings 119 carried by the foot flange 110. Retainers 120 are secured to the tops of the rods and the springs 115 are compressed between the bushings 119 and retainers 120 to bias the foot plate 90 toward the foot flange 110 thereby pressing the valve face rim 113 against the yieldable packing material 112 in the groove 111. Thus the foot valve is biased to a closed position.

Instead of mounting the springs 115 on top of the foot flange 110, the rods 116 could be bolted to the flange 110 and slidably extend through the foot plate 90 with the springs compressed between the bottom ends of the rods and the foot plate. The illustrated mounting of the springs on top of the foot flange 110 is preferred because it permits the assembly to be positioned very close to the bottom 13 of the reservoir.

As shown in FIG. 2, the cylindrical shell 69 of the pump and motor unit 23 has rollers 123 mounted therearound in brackets 124. Circumferentially spaced guide ribs 125 provided by the bosses receiving the mounting studs for the top casing portion 39 are sized to fit freely within the casing 12 to cooperate with the rollers 123 in guiding the unit 23 in the casing. Similar guide ribs 126 are also provided at spaced intervals around the upper portion of the pump housing 71. These rollers and guide ribs align the pump and motor unit for coaxial movement in the casing 12.

The bottom end of the pump housing 71 seats on an internal frusto-conical wall 127 of the adapter housing 80 for the foot valve assembly. This frusto-conical wall 127 converges from the flange 106 of the adapter housing to the cylindrical wall 128 of the housing. The bottom end of the pump casing 71 has a mating conical face 129 formed around an outturned flange 130 of the casing.

When the pump and motor unit 23 is lowered to the bottom of the casing 12, the conical face 129 will be guided by the conical seat 127 to center the assembly in the adpater housing 80 as shown in FIGS. 6 and 7. When the two faces 127 and 129 engage each other as shown in FIG. 6, the bottom projecting rim or rib 121 of the inlet casing 79 will seat on the top rim of the inlet fitting 89 and the foot plate 90 will be moved downwardly from the position of FIG. 7 to the position of FIG. 6 thereby opening the valve.

To prevent relative rotation between the pump and motor unit 21 and the adapter housing 80, a plurality of radial vanes 131 are provided around the wall 79 of the inlet housing 77 and cooperating radial vanes 132 extend inwardly from the cylindrical wall 128 of the adapter housing 80. The vanes 131 and 132 are positioned to interleave with each other and prevent relative rotation between the pump and motor unit 23 and the adapter housing 80.

Several pull rods 133 (one being shown) are provided to close the foot valve 25 in the event the springs 115 fail to function when the pump and motor unit 23 is lifted off of the adapter housing 80. These rods 133 extend along the outer wall of the casing 12 and are slidably guided at their lower ends through lugs 134 on the top flange 106 of the adapter housing 80. The rods are sectioned and coupled together at spaced intervals along the length of the casing 12 by means of couplings 135. The bottom ends of the bottom rod sections slide through lugs 136 on the foot plate 90 and receive nuts on the projecting ends thereof to engage the foot plate when raised. Lugs 139 also provided on the bottom flange 110 of the adapter housing 80 slidably guide the rods. The upper ends of the rods slide through seal bearings 140 in the manhole cover 17 for the reservoir 11 and manual pull couplings 141 are threaded to the upper ends of the rods to afford a means for raising the rods to force closing of the valve 25.

From the above description it will be understood that the pump and motor unit is lowered through the casing 12 being suitably guided by the rollers 123 and guide ribs 125 and 126. As the unit approaches the foot valve, the cap 27 is seated to the top of the casing with the gland in the raised position shown in FIG. 3. Then the plate 29 is lowered to permit the unit 23 to engage the foot plate 90 of the valve and to come to rest on the conical surface 127 of the adapter housing with the gland preventing leakage from the casing 12. Fluid from the reservoir wil pass through the opened foot valve and pump to seek a level in the casing 12 the same as the level L in the reservoir R. Then when the pump is actuated, the contents of the reservoir will be forced through the casing to the discharge outlet 21. As explained above, when it is desired to replace or repair the pump and motor unit 23, the casing 12 is purged free of the cryogenic fluid and the gland raised from the position of FIG. 2 to the position of FIG. 3 which will bring about a sufficient lifting of the unit 23 off of the foot valve to accommodate closing of the valve. Thus a simplified pump and pressure lock assembly has been provided which makes it possible to store liquified gases in deep well reservoirs over long periods of time and to withdraw these materials as needed without loss of pressure or leakage of air into the reservoir.

I claim as my invention:

1. An assembly adapted for pumping fluids from storage containers and permitting safe removal of pumping equipment without loss of fluid or pressure which comprises a single fluid transmitting casing for extending from the top to the bottom portions of a storage container, a normally closed valve at the bottom of the casing sealing the interior of the casing from the storage container, a fluid outlet at the upper portion of the casing, a sealing gland having a shiftable portion at the top of the casing, a pump and motor unit suspended by means passing through said shiftable portion of said sealing gland in said casing, said unit being adapted to bias the valve to an open position at the bottom of the casing for receiving fluid from the reservoir to flow said fluid through the unit and casing to the outlet thereof, and said shiftable portion of sealing gland accommodating sufficient shifting movement of said means to permit opening and closing of the valve by the pumping unit without venting the casing.

2. A submersible pumping system particularly adapted for pumping cryogenic fluids from reservoirs which comprises a single fluid transmitting casing adapted to depend vertically from the roof to the bottom portion of the storage reservoir, a foot valve normally closing the bottom end of said casing, a sealing gland with a vertically shiftable portion normally closing the top of said casing, a valved discharge outlet adjacent the top of said casing, a pump and motor unit fitting freely in said casing having a downwardly opening inlet adapted to engage the valve at the bottom of the casing for opening the valve to communicate the contents of the reservoir with the interior of the pump, said pump having a discharge outlet communicating with the casing, seal means between the casing and pump preventing flow into the casing except through the pump, means suspending the pump and motor unit through the shiftable sealing gland portion at the top of the casing and means for raising and lowering the shiftable portion of said gland to permit hte suspension means to raise the pump and motor unit off of the valve at the bottom of the casing for permitting closing of the valve and to permit lowering of the pump and motor unit against the valve to open the valve without venting the casing, and means at the top of the casing for purging the interor of the casing whereby removal of the pump and motor unit is accomplished without hazard and without loss of fluid or pressure by purging the cryogenic fluid in the casing through the pump and out of the opened valve back to the reservoir, by next raising the shiftable portion of the sealing gland to lift the pump and motor unit for permitting closure of the valve and by thereafter retracting the pump and motor unit out of the top of the casing for repair or replacement.

3. A pumping system which comprises a single fluid transmitting casing adapted to be suspended from the roof of a reservoir to extend to the bottom of the reservoir, a spring biased valve closing the bottom of the casing, a pump and motor unit adapted to be lowered through the casing to rest on the valve for opening the valve to the interior of the pump, a sealing gland having a shiftable portion at the top of the casing, means suspending the pump and motor unit in the casing through said sealing gland, said portion of said sealing gland adapted to be raised and lowered a sufficient distance so that the suspension means will raise or lower the pump and motor unit onto and off of the valve to effect opening and closing of the valve without venting the casing, and a purge port at the top of the casing adapted to introduce fluid under pressure for discharging fluid through the pump and out of the opened valve back to the reservoir whereby the pump and motor unit may be lifted out of the casing without venting the contents of the reservoir.

4. A pumping system especially suited for frozen hole cryogenic fluid storage reservoirs which comprises a single fluid transmitting vertical casing suspended from the roof of such a reservoir into close proximity with the bottom thereof, a spring biased foot valve closing the bottom of said casing, a pump and motor unit adapted to be lowered through said casing to rest on the foot valve for opening the valve to join the pump inlet with the interior of the reservoir and the pump outlet with the interior of the casing, means for suspending the pump and motor unit in the casing, a sealing gland at the top of the casing supporting the suspension means and having a sealed lift sufficient to cause the supension means to raise the pump and motor unit off of the valve to permit closing of the valve, whereby the pump and motor unit may be mounted for operation in the casing and removed from the casing without venting the casing to the atmosphere while the valve is open.

5. A [pump and motor unit adapted for lowering through] *pumping system for liquefied gas comprising* a fluid transmitting conduit *and a pump and motor unit adapted to be lowered into the conduit* to pump fluid through the conduit [which comprises], *said pump and motor unit comprising* a motor casing of smaller diameter than the conduit, a pump casing mounted on said motor casing having a discharge outlet surrounding the motor casing to discharge fluid into the conduit around the motor casing, means on said pump casing defining a downwardly opening pump inlet adapted to receive fluid, a motor in said motor casing, a shaft extending from said motor through said pump casing, impeller means on said shaft coacting with the pump casing to pump fluid from the inlet to the conduit, and a tapered seat for said unit at the bottom of said conduit to mount the unit centrally in the conduit and to seal the bottom of the conduit except through the pump; *and*

*means for purging the interior of the conduit.*

6. A [pump and motor unit] *pumping system* according to claim 5 including an inducer impeller on the shaft in the inlet and primary and secondary impellers on the shaft in the pump casing.

7. A [pump and motor unit] *pumping system* according to claim 5 wherein a spring biased foot valve controlling flow to the pump inlet is opened by the weight of the unit thereon.

8. [The unit of] *A pumping system according to* claim 5 wherein the *upper end of said* shaft is rotatably mounted in a bearing and a settling basin *in said motor casing above said bearing is* vented to the pumped fliud [supplies] *through a port in the motor casing wall to supply* clear fluid through a stand pipe *in said basin* to the bearing, *said stand pipe extending upwardly from said bearing.*

9. A pressure lock between a main pressurized storage container and the external atmosphere comprising, a sealed closure for the top of said storage container, a single pumped fluid transmitting casing extending downwardly through said closure into said storage container and supported on and sealed to the closure, with its bottom spaced above the bottom of said storage container, a foot valve at the bottom of said casing, means biasing said foot valve to close the bottom of said casing, a pump and motor unit guided for movement along said casing including a motor and a pump disposed therebeneath and driven thereby and having an inlet opening to the bottom of said pump and motor unit an annular abutment face encircling said inlet and adapted to engage and open said valve by the weight of said pump and motor unit thereon to provide a fluid pumping passageway to the interior of said storage container as said pump and motor unit is lowered to its extreme limits of downward movement along said casing, a sealing gland having a slidable portion at the top of said casing and means passing through said gland suspending said pump and motor within said casing.

10. The structure of claim 9, wherein means are provided for guiding said pump and motor unit downwardly along said casing and wherein cooperating frusto-conical surfaces extending inwardly of said casing and about said pump and motor unit centrally seat said pump and motor unit in said casing, seal said pump and motor unit to said casing, and maintain said inlet in fluid pumping association with said valve.

11. The structure of claim 9, wherein a generally annular open ended housing is secured to the bottom of said casing and depends therefrom, wherein said foot valve is disposed beneath said annular housing and is downwardly movable with respect thereto to provide fluid communication with said pump and motor unit, wherein cooperating internal and external frusto-conical sealing faces on said pump and motor unit and said housing maintain said pump and motor unit in sealed relation with respect to said housing and center said pump and motor unit with respect to the interior of said housing, and wherein spring means connected between said housing and foot valve bias said foot valve into a closed position.

12. The structure of claim 11, wherein manually operable jogger means operable from the top of said closure is provided to jog said foot valve into a closed position upon failure of said spring to close said valve.

13. The structure of claim 11, wherein a cap is sealed to the top of said casing, wherein a flexible cable suspends said pump and motor unit from said cap, and wherein flexible electrical conductors sealed to said cap and said pump and motor unit supply electrical power to energize said motor.

14. A lock particularly adapted for a main storage container storing gases in liquid from under pressure and accommodating purging of the reservoir of fluid and flammable gas and the pumping of pressurized liquid gas therein from the container comprising, a sealed closure for the top of the storage container, a single pumped fluid transmitting casing sealed to said closure and extending therethrough and supported thereon with its bottom in vertically spaced relation with respect to the bottom of said storage container, a foot valve extending beneath the bottom of said casing, spring means suspending said valve from said casing and biasing said valve into position to seal the open bottom end of said casing, said foot valve having an inlet fitting spaced inwardly of said casing, a pump and motor unit guided for movement along said casing, a cap sealed to the top of said casing and supporting said pump and motor unit in said casing adjacent the bottom thereof and accommodating raising and lowering of said pump and motor unit along said casing, said pump and motor unit including a motor and a pump disposed therebeneath and driven therefrom and having a downwardly opening inlet opening, means guiding said pump and motor unit to register with said inlet fitting on said foot valve and open said foot valve against said spring means by the weight of said pump and motor unit thereon, and centering said pump and motor unit with respect to said foot valve and retaining said pump and motor unit from rotation, said guiding means comprising, mating internal and external frusto-conical centering surfaces in association with said casing and said pump and motor unit and spaced leaving radial vanes in association with said casing and said pump and motor unit.

15. In a submerged pumping system having a storage container, with a casing extending from the top to the bottom portions thereof and a removable pump and motor unit slidably received in the casing, the improvement of a spring biased normally closed valve means depending from the bottom of the casing and adapted to be opened by the weight of the pump and motor unit to vent the bottom of the casing to the container and cooperating tapered means associated with the unit and valve means to align the unit with the valve means, center the unit in the casing, seat the unit in the casing, and seal the casing from the storage container except through the unit.

16. In a submersible pumping system including a storage container, a casing extending from the top to the bottom portions thereof, and a removable pump and motor unit received in said casing, the improvement of a foot valve means sealing and communicating the casing to the storage container, said valve means spring biased in a closed position, said valve means having an *annular* abutting face interiorally of said casing, said valve means having a generally annular frusto-conical seating face associated therewith spaced from the abutting face, said valve means depending from the casing, said pump and motor unit having *a downwardly opening pump inlet and* an *annular* abutting face [on the bottom thereof] *encircling said inlet* adapted to mate with the abutting face of the valve means to overcome the spring bias and open the valve means by the weight of the pump and motor unit and said pump and motor unit having a generally annular frusto-conical seating face therearound adapted to mate with the said seating face associated with the foot valve means to seat the pump and motor unit at the bottom of the casing and to center the unit in the casing and to align the said abutting face on the unit for mating with the abutting face of the valve means whereby the mating of the frusto-conical seating faces properly aligns the pump and motor unit with the valve means.

*17. An assembly as claimed in claim 1, wherein*

*said pump and motor unit includes a motor and a pump disposed therebeneath and driven by said motor,*

*said pump includes a pump outlet in communication with the interior of the casing and a pump inlet having an annular abutment face formed thereon which encircles said pump inlet,*

*said normally closed valve including a movable foot plate biased toward a closed position, said movable foot plate including an inlet fitting opening to the periphery of said foot plate,*

*said annular abutment face engaging said inlet fitting of said normally closed valve for opening the same under influence of the weight of said pump and motor unit to provide a sealed passageway for fluid exiting from the interior of the storage container through said inlet fitting to said pump inlet.*

*18. An assembly as claimed in claim 17, including*

*a plurality of springs circumferentially spaced around said inlet fitting, each of said springs being coupled*

*between said foot plate and the casing to bias the valve toward a closed position.*

*19. An assembly as claimed in claim 1, including*

*spaced radial vanes associated with the casing and the pump and motor unit for interleaving with one another to prevent rotation of the pump and motor when seated on said normally closed valve.*

*20. A pumping system as claimed in claim 3, wherein*

*said pump and motor unit includes a motor and a pump disposed therebeneath and driven by said motor,*

*said pump includes a pump outlet in communication with the interior of the casing and a pump inlet having annular abutment face formed thereon which encircles said pump inlet,*

*said spring biased valve including a movable foot plate biased toward a closed position, said movable foot plate including an inlet fitting opening to the periphery of said foot plate,*

*said annular abutment face engaging said inlet fitting of said spring biased valve for opening the same under influence of the weight of said pump and motor unit to provide a sealed passageway for fluid exiting from the interior of the storage container through said inlet fitting to said pump inlet.*

*21. A pumping system as claimed in claim 20, including*

*a plurality of springs circumferentially spaced around said inlet fitting, each of said springs being coupled between said foot plate and the casing to bias the valve toward a closed position.*

*22. A pumping system as claimed in claim 3, including*

*spaced radial vanes associated with the casing and pump and motor unit for interleaving with one another to prevent rotation of the pump and motor unit in the casing when seated on the spring biased valve.*

*23. A pumping system as claimed in claim 3, wherein:*

*said suspension means is flexible.*

*24. A pumping system as claimed in claim 4, wherein:*

*the pump of the pump and motor unit is disposed beneath the motor and driven thereby, said pump having an annular abutment face thereon which encircles the pump inlet,*

*said spring biased foot valve including a movable foot plate biased toward a closed position, said movable foot plate including an inlet fitting opening to the periphery of said foot plate,*

*said annular abutment face engaging said inlet fitting of said normally closed valve for opening the same under influence of the weight of said pump and motor unit to provide a sealed passageway for fluid exiting from the interior of the storage container through said inlet fitting to said pump inlet.*

*25. A pumping system as claimed in claim 24, including:*

*a plurality of springs circumferentially spaced around said inlet fitting, each of said springs being coupled between said foot plate and the casing to bias the foot valve toward a closed position.*

*26. A pumpng system as claimed in claim 4, including:*

*spaced radial vanes associated with the casing and the pump and motor unt for interleaving with one another to prevent rotation of the pump and motor when seated on the foot valve.*

*27. A pumping system as claimed in claim 4, wherein:*

*said suspension means is flexible.*

*28. A pressure lock as claimed in claim 9, wherein:*

*said foot valve includes a movable foot plate with an inlet fitting opening to the periphery of said foot valve,*

*said annular abutment face engaging said inlet fitting of said foot valve for opening the same under influence of the weight of said pump and motor unit to provide a sealed passageway for fluid exiting from the interior of the storage container through said inlet fitting to said pump inlet.*

*29. A pressure lock as claimed in claim 28, wherein:*

*said biasing means including a plurality of springs circumferentially spaced around said inlet fitting, each of said springs being coupled between said foot plate and the casing to bias the foot valve toward a closed position.*

*30. A pressure lock as claimed in claim 3, including:*

*spaced radial vanes associated with the casing and the pump and motor unit for interleaving with one another and to prevent rotation of the pump and motor unit when seated on the foot valve.*

*31. A pressure lock as claimed in claim 9, wherein:*

*said suspension means in flexible.*

* * * * *